(12) United States Patent
Ohta (10) Patent No.: US 7,085,983 B2
(45) Date of Patent: Aug. 1, 2006

(54) MATRIX OPERATION PROCESSING DEVICE

(75) Inventor: Mitsuhiko Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 408 days.

(21) Appl. No.: 10/402,623

(22) Filed: Mar. 28, 2003

(65) Prior Publication Data

US 2003/0187899 A1    Oct. 2, 2003

(30) Foreign Application Priority Data

Mar. 29, 2002    (JP)    ............................. 2002-098025

(51) Int. Cl.
*H03M 13/13*    (2006.01)
(52) U.S. Cl. ...................... 714/752; 714/757; 714/759
(58) Field of Classification Search ................ 714/757, 714/759, 752
See application file for complete search history.

(56) References Cited

U.S. PATENT DOCUMENTS

| | | | |
|---|---|---|---|
| 4,450,561 A * | 5/1984 | Gotze et al. ................. 714/757 |
| 2002/0188906 A1 * | 12/2002 | Kurtas et al. ................ 714/755 |
| 2003/0033570 A1 * | 2/2003 | Khannanov et al. ......... 714/755 |
| 2003/0037298 A1 * | 2/2003 | Eleftheriou et al. ......... 714/752 |

* cited by examiner

*Primary Examiner*—Stephen M. Baker
(74) *Attorney, Agent, or Firm*—Greer, Burns & Crain, Ltd.

(57) ABSTRACT

An input data signal string I is temporarily stored in an input register, and is input to a parallel adder operating according to the instruction of a control unit. The control unit designates an address of a ROM storing a check matrix H, and obtains information about locations of "1s" in a specific column of the check matrix corresponding to a current input data bit. The ROM instructs selectors SEL1#1–SEL1#CW to select from a register reg(M) bits corresponding to rows in which the check matrix value is 1 for the specified matrix column and sends the selected values to the adder. Results of the additions and the values output from the reg(M) are selected between for input to the reg(M) through the selectors SEL2#1–SEL2#M. This process is repeated until all the input bits have been processed.

10 Claims, 8 Drawing Sheets

MATRIX OPERATION PROCESSING DEVICE

BACKGROUND OF THE INVENTION

1. Field of the Invention

The present invention relates to a matrix operation processing device.

2. Description of the Related Art

Currently, many data processing devices, including personal computers, are commercialized and are put into practical use. In such data processing devices, data is stored or transferred after being encoded. In particular, if digital signals are received from a storage/reproduction medium, such as a magnetic disk, an optical disk, a magneto-optical disk and the like, or a network, and are decoded, an LDPC (low density parity check) code is sometimes used for error correction.

In order to obtain a process result P using N bits of signal data string I and N×M bits of check matrix H, the matrix operation $P=H*I^T$ is needed. For example, if the following equation holds true, $$I = [i_0, i_1, \Lambda, i_{N-1}], \quad P = [p_0, p_1, \Lambda, p_{M-1}],$$

$$H = \begin{bmatrix} h_{00} & h_{01} & \Lambda & h_{0N-1} \\ M & M & M & M \\ h_{M-10} & h_{M-11} & \Lambda & h_{M-1M-1} \end{bmatrix}$$

the process result P can be calculated as follows.

$$P_m = \sum_{n=0}^{N-1} h_{mn} * i_n \quad (1)$$

In this case, for example, a magnetic disk device being a typical storage/reproduction medium is provided with an error correction function. An LDPC code is one of possibly many codes used for such error correction. In this case, calculating this code requires such a matrix operation.

A check matrix used for a parity calculation or an LDPC decoding contains only binary values (1s and 0s. In this case, equation (1) is as follows.

$$P_m = \sum_{\substack{n=0/h_{mn}=1}}^{N-1} i_n \quad (2)$$

Figure 1:
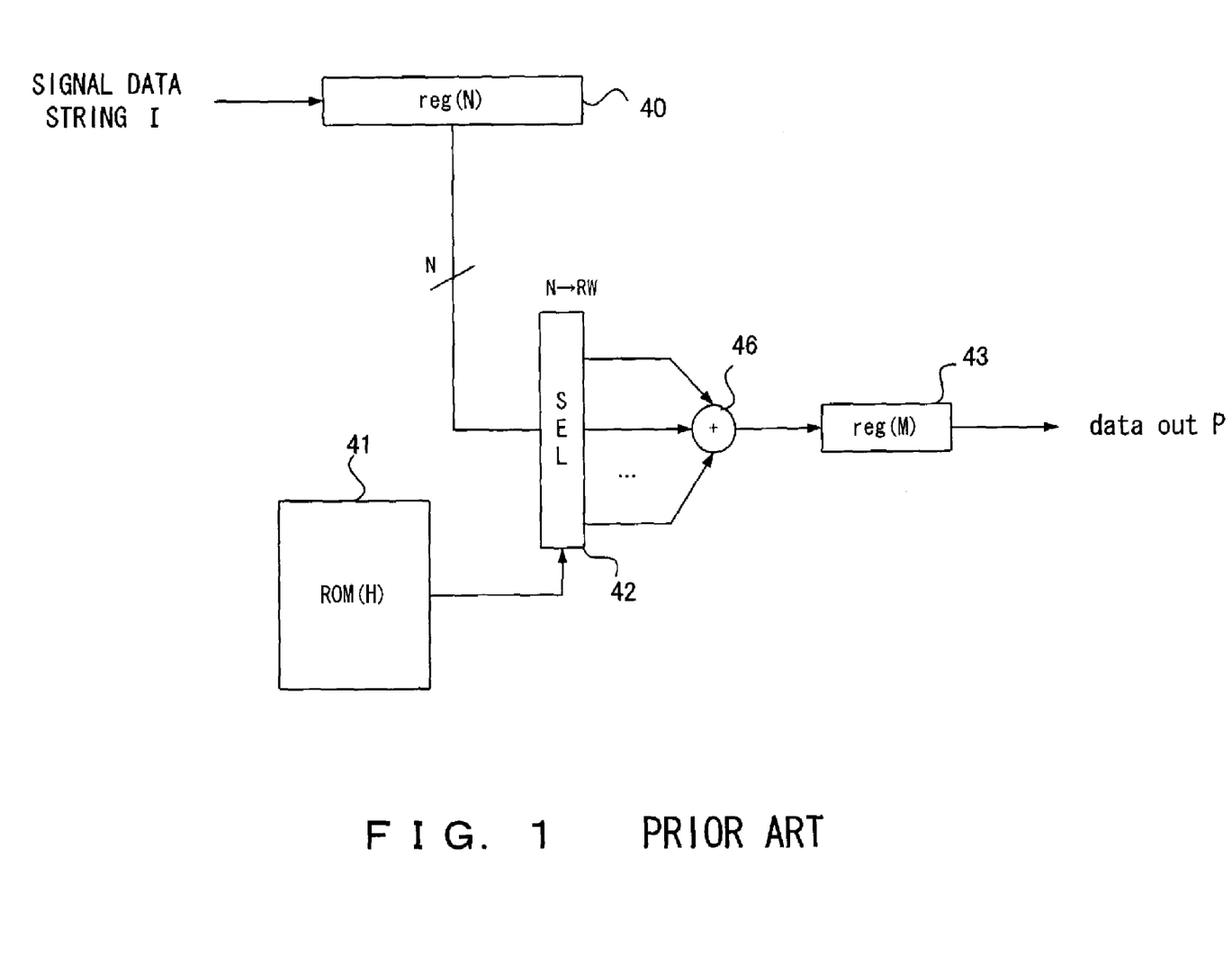
FIG. 1 shows a conventional matrix operating circuit.

FIG. 1 shows a conventional matrix operation circuit.

In order to obtain the process result P by performing such a process, equation (2) must be calculated after the full data of the signal data string I are obtained.

After all the full data of the signal data string I are stored in a register 40, a selector SEL 42 selects items, the value of which is 1 in each row read from a ROM 14 and the like storing a matrix datum H, and an adder 46 adds the items. The result of the addition is stored in a register 43. In this case, RW represents the maximum number of 1s in each row. By repeating this process M times, the process result P can be obtained. In this case, if the selector and adder are shared until the full data of P are obtained, the process runs in O(N+M) time and causes great delay, which is a problem. In this case, a storage register N with a large circuit scale and/or RW adders is also needed.

Figure 2:
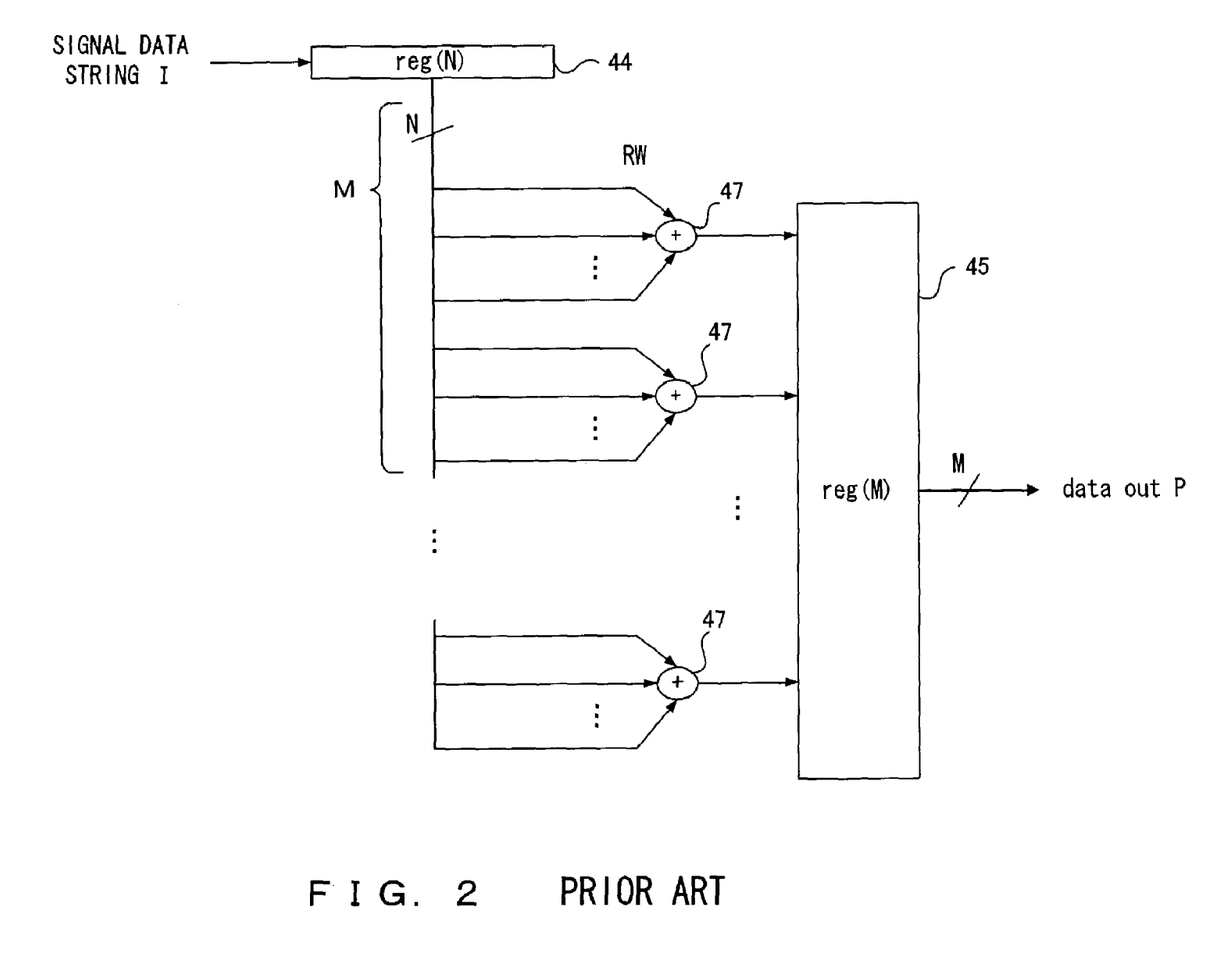
FIG. 2 shows another conventional matrix operating circuit.

FIG. 2 shows another conventional matrix operation circuit.

In this conventional matrix operation circuit, after the full data of a signal data string I are stored in a register 44, an adder 47 wired based on the matrix H calculates the full data of the process result P. The result is stored in a register 45 and is output. In this case, although only O(N) time is needed to obtain the full of data of P, the size of a storage register N and the circuit scale become large since RW×M adders are needed, which is another problem.

SUMMARY OF THE INVENTION

It is an object of the present invention to provide a matrix operation processing device performing a high-speed matrix operation with a small circuit scale.

The matrix operation processing device of the present invention comprises a storage unit storing the elements of a matrix; a register storing a value, all initially set all 0s, and sequentially storing the result of a sequentially performed operation; an adder adding an input data value to a value output from the register; an operation control unit inputting a necessary value in the register to the adder, based on the matrix element value and adding an input data value to the value from the register; and a loop-back unit appropriately selecting the output of the adder and the output of the register and storing them in the register again.

According to the present invention, the number of adders and the circuit scale can be reduced compared to the conventional circuit. If only necessary information about a matrix is stored, memory capacity can also be reduced and a small high-speed matrix operation processing device can be realized.

DESCRIPTION OF THE PREFERRED EMBODIMENTS

In the matrix operation $P=H \times I^T$, obtaining a process result P using N bits of a signal data string I and N×M bits of a check matrix H, process delay and circuit scale are reduced by performing necessary operations for each column of the check matrix H and accumulating the result for each row. In particular, in a check matrix for error correcting codes needed for coding, the number of the rows M of the check matrix is far smaller than the number of the columns N. Therefore, by calculating a plurality of pieces of data in each column in parallel and accumulating the result for each row, the number of adders and circuit scale can be reduced.

The matrix operation processing device comprises a storage unit storing a process result P, such as a register or the like; a storage unit storing a check matrix H, such as a ROM or the like; a unit reading the check matrix H and process result P when an address counter or the like receives a signal data string I and controlling the storage; and an operation unit, such as an adder or the like. The device obtains column data, the input data which must be processed every time the device receives a signal data string I, from H, reads necessary items of a target process result P, multiplies the received data by the necessary items and writes the result back into the storage unit as the process result P. By repeating this process for all the full received data of the signal data string I, a process result P can be obtained.

Figure 3:
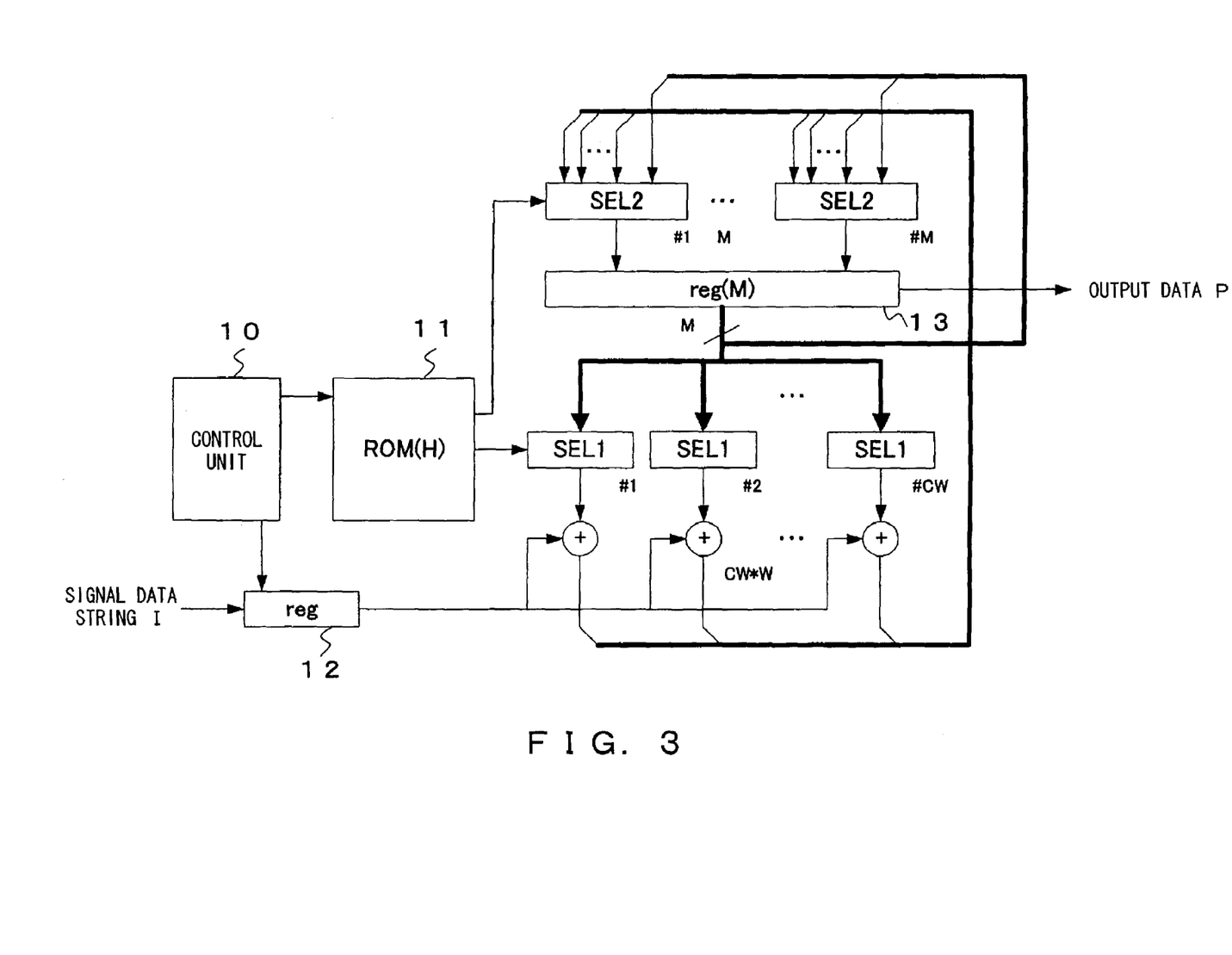
FIG. 3 shows an example configuration of the matrix operation circuit according to the preferred embodiment of the present invention.

FIG. 3 shows an example configuration of a matrix operation circuit according to the preferred embodiment of the present invention.

A control unit 10 controls the reception of a signal data string I and stores it in a storage unit reg 12. The control unit 10 also obtains the positions of 1s in the matrix column from a storage unit 11 for a check matrix H, based on the position of the currently-processed bit in the received data. A storage unit reg(M) 13 for the process result P is initialized to all 0s prior to data reception. The control unit 10 and storage unit 11 enable the data selectors SEL 1 to select bits of the intermediate parity result P for respectively adding an input data bit to the selected bits. In this case, the number of adders is the same as the maximum number, column weights CW, of 1s in the columns of the parity matrix. Each selector SEL 1 is a selector for M→1 and the number of the selectors is M. Each selector SEL 2 selects between a result of the additions and data read from the reg(M) 13 and writes the selected data into the reg(M) 13.

Specifically, in FIG. 3, one bit of the signal data string I stored in the reg 12 is read by the control unit 10 and is input to each adder. The control unit 10 detects the position of an element with value 1 in an appropriate column of the check matrix from a ROM 11, a selector SEL1 corresponding to the position of the element with value 1 in the column of the check matrix selects a value output from the reg (M) 13 and adds the value to the signal data bit. The result of the addition is sent to selectors SEL2. A selector SEL2 inputs the adder result to the reg(M) 13. For a data value to which addition has not been applied, the selector SEL2 inputs the already-stored register value back to the reg(M) 13 again. When the rejection/processing of all the signal I data bits finishes, the reg (M) 13 outputs the completed parity data P.

Speaking more conceptually, it is determined to which column the element of an input signal data string I bit should be multiplied when the bits in I are read, by obtaining the offset of the bits in I. When bits in the input string I are input, the corresponding column information of the check matrix is read and the adder operations are performed in parallel Then, the results are stored in the reg(M), and accumulated for each bit of the string I sequentially input. When all additions are completed, a parity row vector is obtained and the operation terminates.

According to this device, data process running time is O(N). As for circuit scale, the respective number of adders and storage registers become CW and M, respectively.

If the storage unit for a check matrix H stores the positions of 1s for each matrix row as selector address values, then the positions of 1s in a row of the matrix are stored as a set of addresses (Cadd1, Cadd2, Cadd3) at an address of a ROM (H). In this case, Cadd represents the position of the n-th 1 in a column, and if the number of 1s is less than CW, at least one stored address value is designated as 0.

For example, if H(N=8, M=5) is as follows, $$H = \begin{bmatrix} 1 & 0 & 1 & 1 & 0 & 1 & 1 & 0 \\ 0 & 1 & 0 & 1 & 1 & 1 & 1 & 1 \\ 1 & 0 & 1 & 0 & 0 & 0 & 1 & 1 \\ 1 & 1 & 0 & 1 & 1 & 0 & 0 & 1 \\ 0 & 1 & 1 & 0 & 1 & 1 & 0 & 0 \end{bmatrix}$$

data are stored as follows.

TABLE 1

| address | data |
|---|---|
| 0 | (1, 3, 4) |
| 1 | (2, 4, 5) |
| 2 | (1, 3, 5) |
| 3 | (1, 2, 4) |
| 4 | (2, 4, 5) |
| 5 | (1, 2, 5) |
| 6 | (1, 2, 3) |
| 7 | (2, 3, 4) |

In this case, each address can be represented by three bits (0~5<8). Therefore, if CW=3, 3×3=9 bits can be stored as one word.

If the offset of an input data string I is 0,(1, 3, 4) is output from the ROM(H). The three selectors SEL1 respectively select the first, third, and fourth bits of reg(M), going from left to right. Then, each of the first, third and fourth selectors SEL2, going from left to right, selects a signal from a corresponding bit-adder, and each of the other selectors SEL2 selects a bit from M.

The respective realized control of SEL1 and SEL2 are shown below. If it is assumed that each selector SEL1 is a selector for M→1 and a control signal represents m (integer), the selector SEL1 selects/outputs the m-th data bit of reg(M). In this case, if every three bits from the MSB of the output from the ROM can be designated as a control signal m, the control of the selector SEL1 can be realized.

If it is assumed the SEL2 is a selector for (CW+1)→1 and control signals select as follows, 0→; 1→SEL#1; 2→SEL1#2 and 4→SEL1#CW the control of the SEL2 can be realized by inputting the output from the ROM to the data multiplexer decoder shown in Table 2 and designating the output of each decoder as control signals, as shown in Table 2.

TABLE 2

| input | output data |
|---|---|
| 0 | 0 (00000b) |
| 1 | 1 (00001b) |
| 2 | 2 (00010b) |
| 3 | 4 (00100b) |
| 4 | 8 (01000b) |
| 5 | 16 (10000b) |

Figure 4:
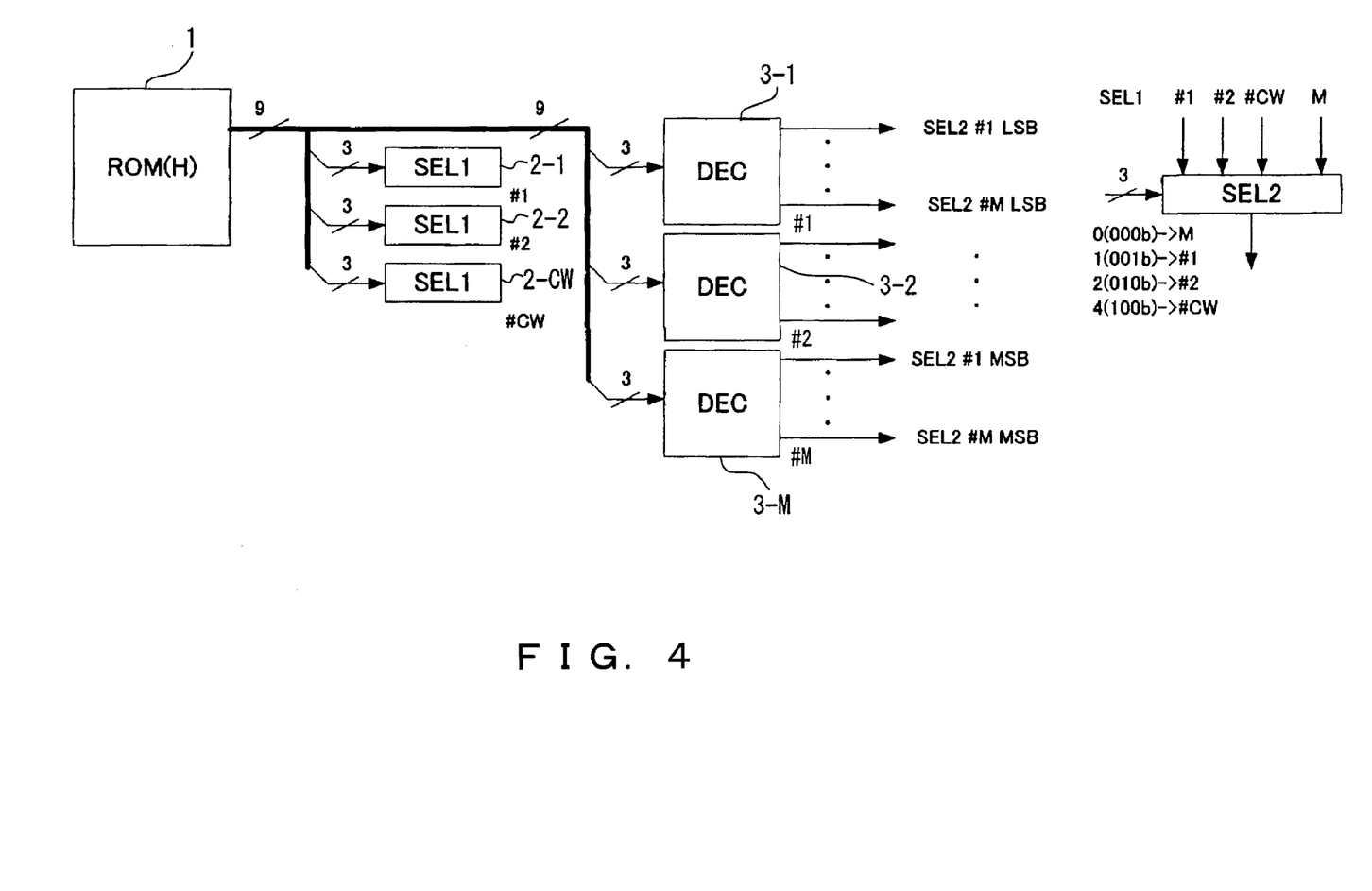
FIG. 4 shows an example circuit representing the operation of the preferred embodiment of the present invention.

FIG. 4 shows an example of the circuit representing the operation of the preferred embodiment of the present invention.

Control signals are output from a ROM (H) 1 and are input to each of selectors SEL1#1 through SEL1#CW and each of multiplexer decoders DEC3-1 through 3-*n*. Signals obtained by decoding the control signals from the ROM (H) 1 to the selection signals of a selector SEL2 are output from the multiplexer decoder DEC3-1 through 3-*n*. The SEL2 is controlled by signals from these multiplexer decoders DEC3-1 through 3-*n*.

An example of how to generate a reading address for a matrix H

FIGS. 5 through 8 show examples of the realized control unit according to the preferred embodiment of the present invention.

Figure 5:
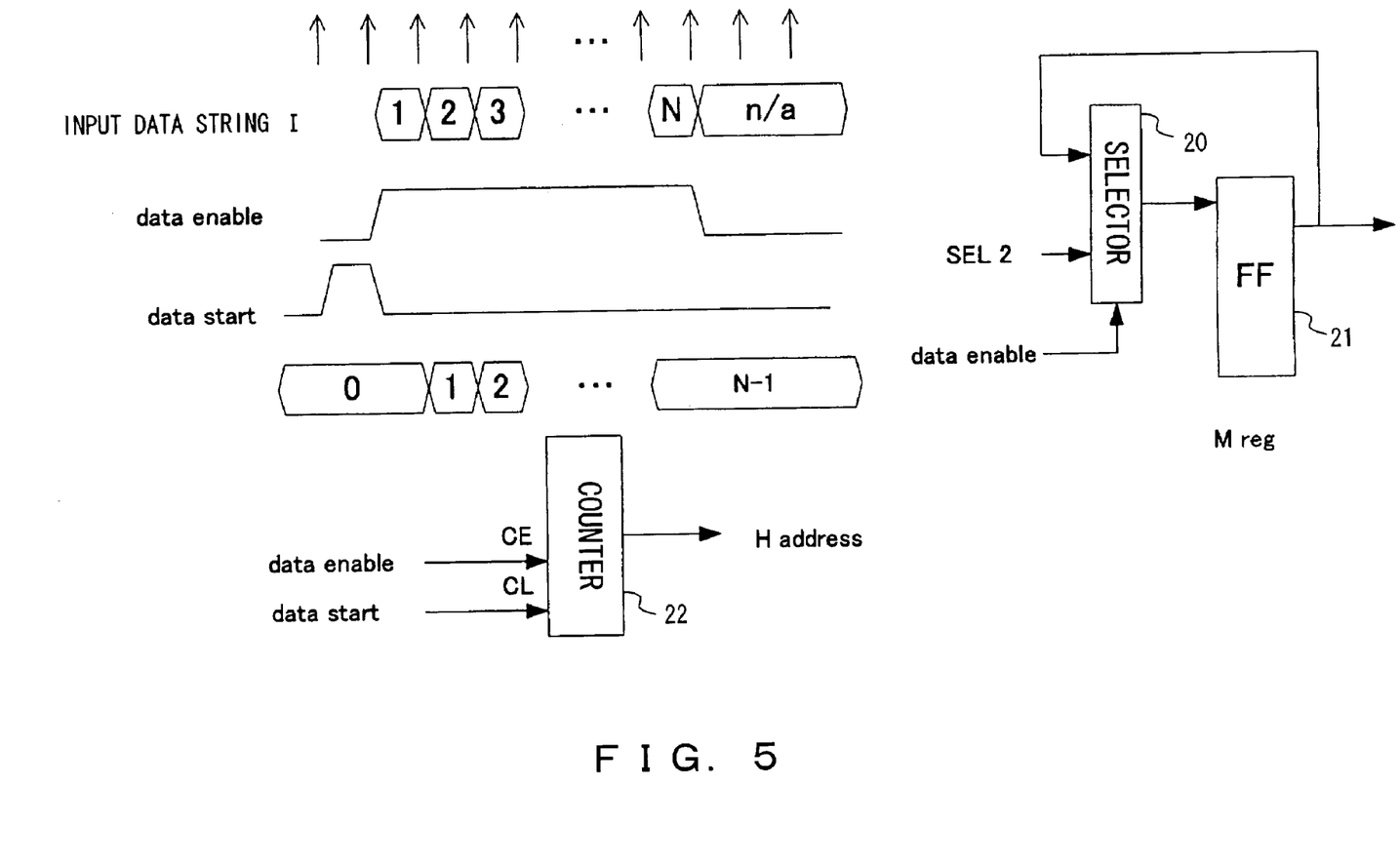
FIG. 5 shows an example of the realized control unit according to the preferred embodiment of the present invention (No. 1).

First, if at the top of an input data string I, data_start is as shown in FIG. 5 and during the valid time period of the data I, data_enable is as shown in FIG. 5, a control unit can be implemented by using a counter 22 with count enable (count up by 1) and clear (all 0 by 1). In the case of the matrix described above, a three-bit counter (0~7) can function as the control unit.

As shown in FIG. 5, an M storage register can be realized by selecting output SEL2 if data_enable is 1, and storing it in an FF 21. If it is 0, the M storage register can be realized by selecting data using a selector 20 and storing the data in a FF 21.

Figure 6:
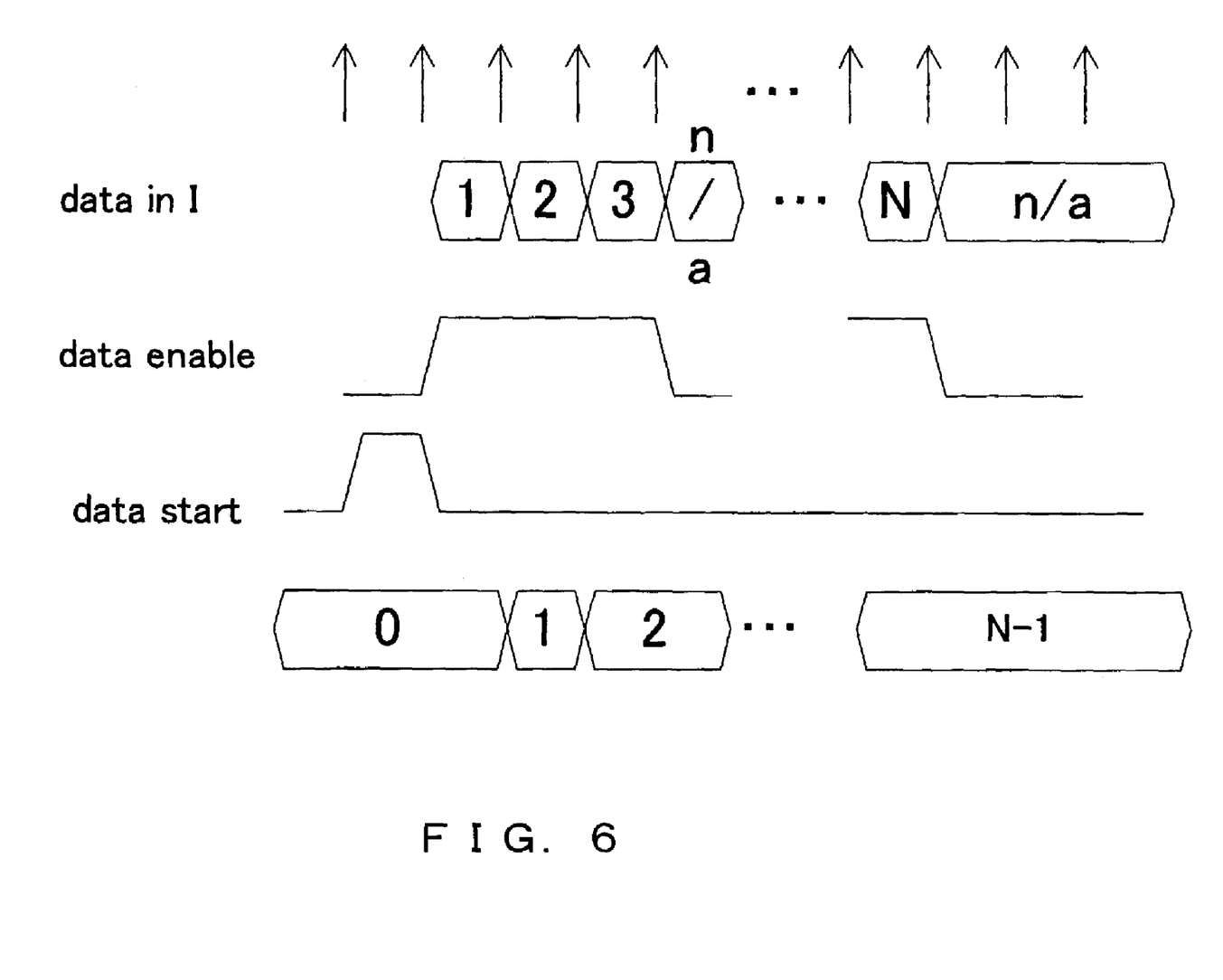
FIG. 6 shows an example of the realized control unit according to the preferred embodiment of the present invention (No. 2).

In this case, data_enable can also be discontinuous, as shown in FIG. 6. If data I is input in descending order, the control unit can be realized by storing H in reverse order.

In FIG. 6, the control unit can be realized by replacing the counter with a down-counter with a loading function and loading a value N−1 by data_start, down-counting the data by data_enable.

If data I is input in a pre-defined order, the control unit can be realized by storing H in that pre-defined order.

If input data I is interleaved, the control unit can be realized by storing H in that order.

Figure 7:
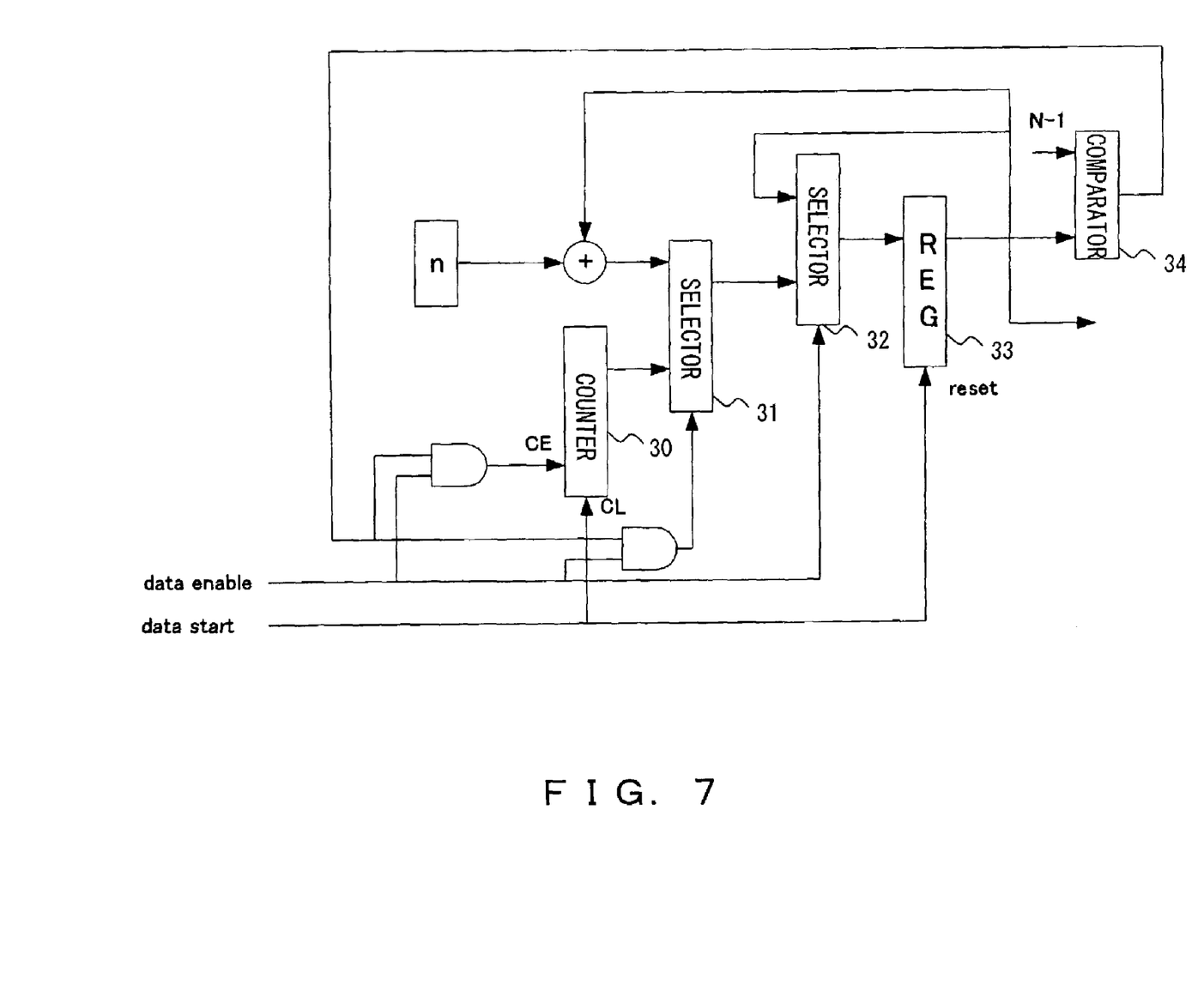
FIG. 7 shows an example of the realized control unit according to the preferred embodiment of the present invention (No. 3).

The control unit can also be realized by the configuration shown in FIG. 7. In this case, n is an interleave interval. If n=2, the input order of the example described above (0~7) becomes 0, 2, 4, 6, 1, 3, 5 and 7.

A REG 33 is an FF storing addresses. When data_enable is 1, selectors 31 and 32 select data in the lower parts of selectors 31 and 32, respectively. A comparator 34 compares the count enable of a counter 30 and input to the port in the upper parts of the selectors 31 or 32.

The operations are as follows:

1. "0" is loaded into all REGs by data_start, and 1 is loaded into the counter 30 by clear.
2. A value obtained by adding n to the value of the REG 33 can be loaded (set) by data_enable.
3. It is tested whether REG>N−1. If it holds true, the process proceeds to step 4. If it does not hold true, the flow returns step 2.
4. The flow returns to step 1 by data_start. Otherwise, by data_enable, a counter value is set in the REG 33. By CE, the counter 30 is incremented by one and the flow returns to step 2.

If in this configuration, n=1, data in ascending order without interleave are obtained.

Figure 8:
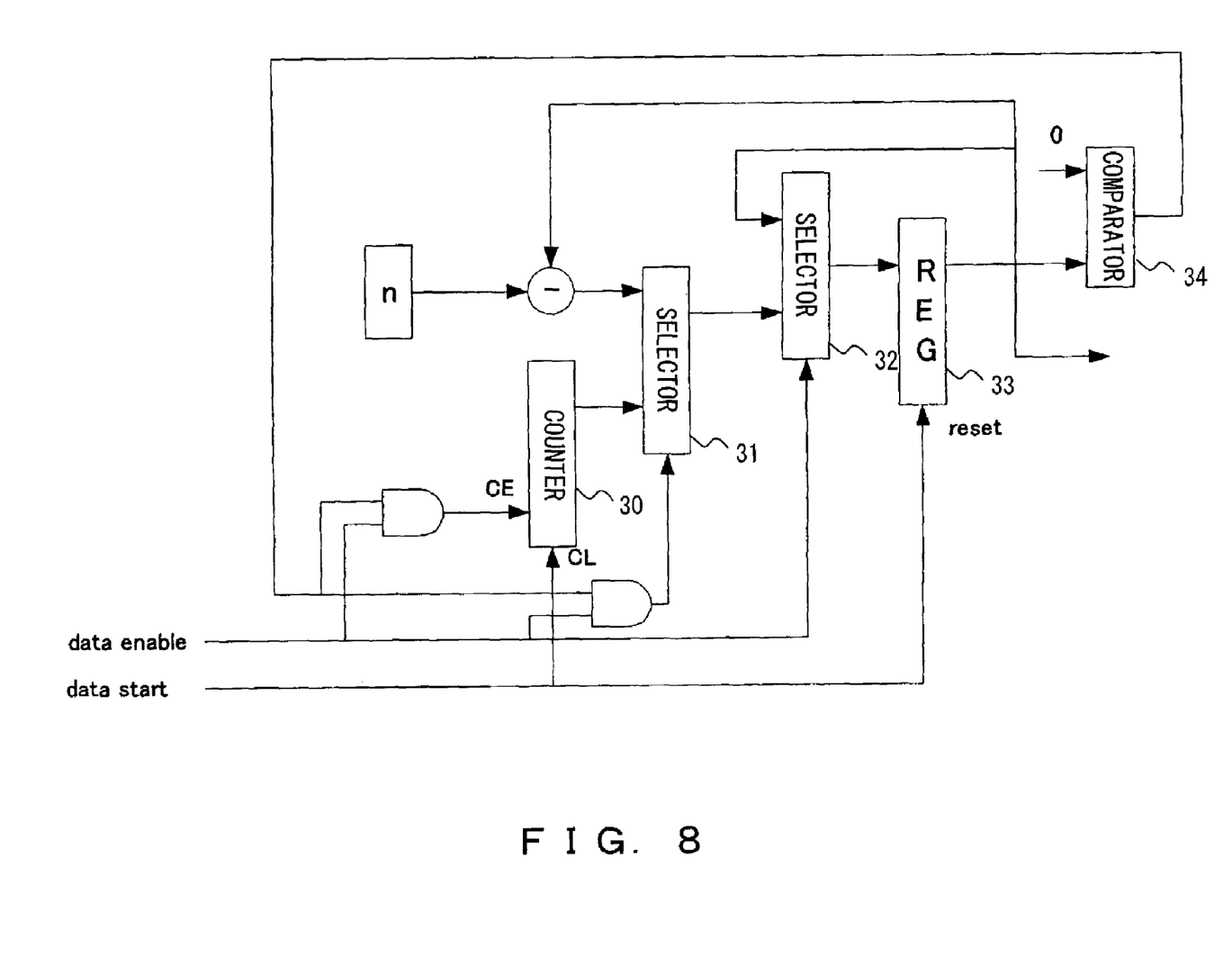
FIG. 8 shows an example of the realized control unit according to the preferred embodiment of the present invention (No. 4).

In the configuration shown in FIG. 8, the operations are as follows, and data interleaved and in reverse order can be obtained.

1. N−1 is loaded into the REG 33 by data_start, and N−2 is loaded into the counter 30 by clear.
2. A value obtained by subtracting n from the value of the REG 33 is loaded (set) by data_enable.
3. It is tested whether REG=0. If it holds true, the flow proceeds to step 4. If it does not hold true, the flow returns to step 2.
4. The flow returns to step 1 by data_start. Otherwise, by data_enable, a counter value is set in the REG 33. By CE, the counter 30 is decremented by one, and the flow returns to step 2.

In the preferred embodiment described above, comparison is made in one example of the check matrix for LDPC codes. In this case, if N=4352, M=256 and RW=51, in the preferred embodiment, the capacity of a storage memory becomes M/N=¼ compared with that in the prior art. The number of adders becomes CW/RW=$\frac{3}{51}$ compared with that in the configuration shown in FIG. 1, and becomes CW/RW×M=$\frac{3}{13056}$ compared with that in the configuration shown in FIG. 2.

In the device of the preferred embodiment, the process is performed for each column. Thus, the process can be performed regardless of the order in which the N bits of a signal data string I are received. By processing data for each column, the processing of N bits of a signal data string I can be started from an arbitrary position.

Furthermore, in the preferred embodiment, a check matrix H can be stored by storing only the address of an item to be processed. Therefore, the circuit scale of the storage unit can be reduced.

If the entire matrix is stored, capacity for M bits×N addresses is needed. However, if only its addresses are stored, only capacity for $\log_2(M)$bits×CW is needed.

Furthermore, by storing the order in which the signal data string I is received using a matrix storage unit a processing device that can handle any receiving order can be realized.

Furthermore, as described above, when a signal data string I is received in reverse order, there is no need to modify the circuit if only the addresses of the matrix are stored in reverse order.

In the device described above, by storing the order in which the signal data string I is received using control data provided for a matrix storage unit, a processing device regardless of receiving order can be realized.

For example, by organizing order in which addresses are received into a table using registers, dynamic modification to adapt to order in which data are received becomes possible.

In the preferred embodiments described above, although the number of selectors with a fairly small circuit scale increases, the number of adders with a fairly large circuit scale decreases. Therefore, as a whole, circuit scale can be reduced.

Since the ROM only stores the position of the is in a check matrix, there is no need for the ROM to store all the matrix elements. Therefore, memory capacity can be reduced. In particular, in the case of an LDPC code, since the number of 1s is fairly small, memory capacity can be effectively reduced.

In the description of the preferred embodiments given above, although it is assumed that the signal value of an input data string I is a binary bit string, the present invention is not limited to this. Even when the signal value is composed of real numbers, the present invention is similarly applicable.

For the details of an LDPC code and its coding, see the following references.

Tadashi Wadayama, "Low-Density Parity Check Codes and a Decoding Method thereof", Proceedings of the magnetic Recording Study Group, December 2001.

(1) Tadashi Wadayama, "An Extension of Gallager Ensemble Of Low-Density Parity Check Codes", IEICE Trans. Fundamentals, Vol. E85-A, No. 1, January 2002

According to the present invention, the delay and circuit scale of a matrix operation circuit can be reduced.

What is claimed is:

1. A matrix operation processing device, comprising:
   a storage unit for storing elements for a matrix;
   a register unit for storing an all 0s initial value and sequentially storing the result of a sequentially performed operation;
   an adder unit for adding an input data value to a value output from the register unit;
   an operation control unit for inputting a necessary value from the register unit to the adder unit, based on an element value of the matrix and adding an input data value to the value from the register unit; and
   a loop-back unit for appropriately selecting an output of the adder unit and output of the register unit, and storing the selected output into the register unit.

2. The matrix operation processing device according to claim 1, wherein said storage unit only stores information on positions of the 1s in a check matrix.

3. The matrix operation processing device according to claim 1, wherein said operation control unit outputs necessary information from the storage unit in accordance with an offset of an input data value.

4. The matrix operation processing device according to claim 1, wherein said matrix is a check matrix for an error correcting code.

5. The matrix operation processing device according to claim 1, wherein said matrix is a check matrix for an LDPC (low-density parity check)code.

6. A matrix operation processing method, comprising the following steps:
   storing elements of a matrix;
   storing a value, initially all 0s, in a register unit and sequentially storing the result of a sequentially performed operation in the register unit;
   transferring a necessary value stored in the register unit to the adder unit, based on an element value of the matrix and adding an input data value to the necessary value; and
   appropriately selecting an output of the adder unit and an output of the stored value in the register unit, and storing the selected output in the register unit.

7. The matrix operating processing method according to claim 6, wherein in said storing elements step, only information on positions of 1s in a check matrix is stored.

8. The matrix operating processing method according to claim 6, wherein in said transferring step, necessary information is output from the storage unit in accordance with an input order of an input data value.

9. The matrix operating processing method according to claim 6, wherein said matrix is a check matrix for an error correcting code.

10. The matrix operating processing method according to claim 6, wherein said matrix is a check matrix for an LDPC (low-density parity check) code.

* * * * *

UNITED STATES PATENT AND TRADEMARK OFFICE
CERTIFICATE OF CORRECTION

PATENT NO.        : 7,085,983 B2
APPLICATION NO. : 10/402623
DATED             : August 1, 2006
INVENTOR(S)       : Ohta It is certified that error appears in the above-identified patent and that said Letters Patent is hereby corrected as shown below:

On the Patent Face:

In the Abstract, delete "SEL1#1 SEL1#CW" and insert --SEL1#1- SEL1#CW--.

Signed and Sealed this

Fifth Day of December, 2006

JON W. DUDAS
*Director of the United States Patent and Trademark Office*